Sept. 17, 1929.  P. R. HOOPES  1,728,896
TRIMMING MACHINE
Original Filed Aug. 30, 1923   2 Sheets-Sheet 1
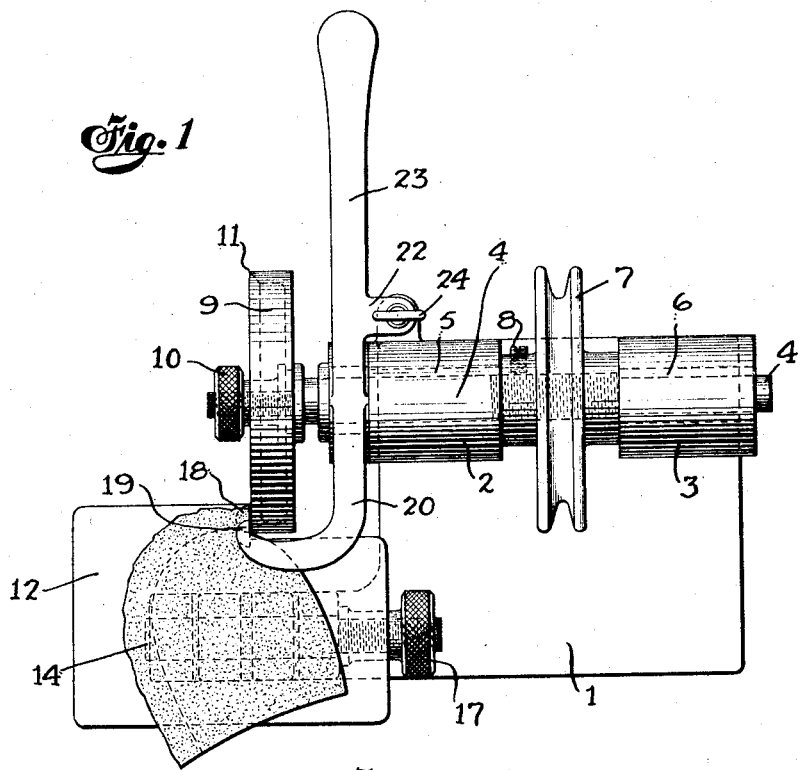
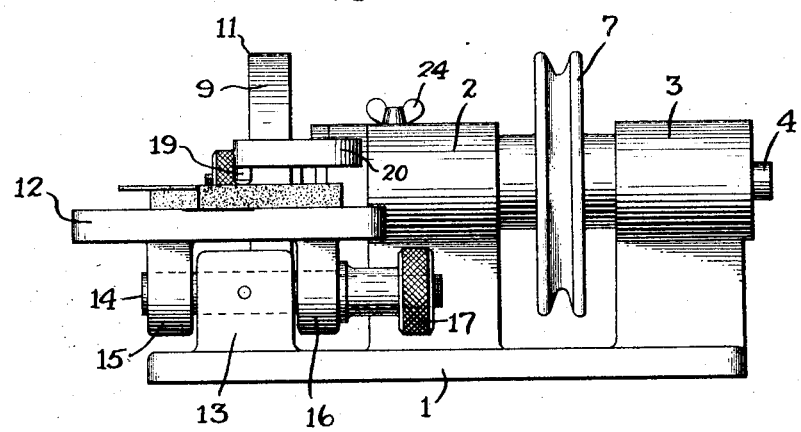

Sept. 17, 1929.   P. R. HOOPES   1,728,896
TRIMMING MACHINE

Original Filed Aug. 30, 1923    2 Sheets-Sheet 2

Patented Sept. 17, 1929

1,728,896

UNITED STATES PATENT OFFICE

PENROSE R. HOOPES, OF HARTFORD, CONNECTICUT, ASSIGNOR TO ESSEX RUBBER COMPANY, OF TRENTON, NEW JERSEY, A CORPORATION OF NEW JERSEY

TRIMMING MACHINE

Application filed August 30, 1923, Serial No. 660,076. Renewed August 14, 1928.

This invention relates to cutting machines and pertains more particularly to a device for trimming the overflow from rubber heels or other moulded articles.

It is an object of this invention to provide a mechanism which will trim the overflow from moulded articles in a simple and efficient manner. It is a further object to provide a mechanism of the character described which will perform the trimming operation surely and accurately without danger of damaging the article.

Other objects and advantages of the invention will appear hereinafter.

Figure 3:
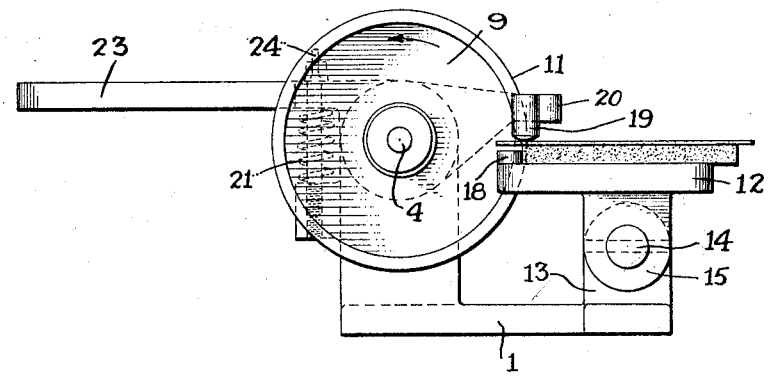
Figure 4:
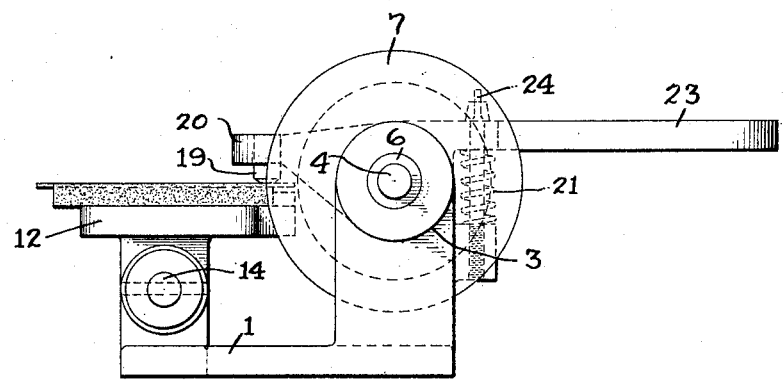

A preferred embodiment of the invention selected for purposes of illustration is shown in the accompanying drawings, in which, Figure 1 is a plan view of the device, Figure 2 is a side elevation, Figures 3 and 4 are front and rear elevations respectively.

Referring to the drawings, the device may be conveniently mounted upon a frame 1 upon which are supported a pair of bosses 2 and 3 in which is journaled a shaft 4. If desired, a bushing 5 may be interposed between the shaft and the boss 2 and a similar bushing 6 interposed between the shaft and the boss 3. The shaft may conveniently be screw threaded between the bosses 2 and 3 to mesh with a corresponding internal screw thread in the pulley 7 mounted thereon. By suitable rotation of the pulley with respect to the shaft, the shaft may be adjusted longitudinally of the main frame 1 for purposes hereinafter set forth. A set screw 8 may be provided to fix the pulley in any desired position on the shaft.

On one end of the shaft 4 is carried a cutter 9 which is removably secured thereto by a thumb nut 10. The cutter 9 is substantially cylindrical and is provided with a sharpened annular cutting edge 11.

A platform 12 is provided to support the article to be cut in proper relation to the cutter. The main frame 1 is provided with a boss 13 extending upwardly therefrom in which is mounted a shaft 14. The platform 12 is provided with a pair of downwardly extending bearings 15 and 16 by means of which the platform may be rotated on the shaft into any desired angular relation with the cutter. A thumb nut 17 is provided to clamp the platform in fixed position.

On the upper side of the platform 12 is mounted a lug 18 to guide the article being trimmed as it approaches cutting position. The outer periphery of the lug 18 may be semi-circular and should be so arranged that the outside edge of the lug is substantially coincident with the outside edge of the cutter.

An additional cutting plate 19 is provided which is shaped to surround the cutting edge 11 of the cutter 9 to prevent friction between the cutter and the article from lifting the article and throwing it from proper cutting position. In order that the cutting plate 19 may be adjusted with respect to the platform 12, and at the same time maintain its position with respect to the cutter 9, it is mounted on an arm 20 journaled loosely on the bushing 5. A spring 21 is provided to bear against an extension 22 of the arm 20 and a handle 23 is formed on the arm in order that the cutting plate 19 may be manually adjusted to the desired height. A thumb screw 24 is provided to limit the downward movement of the guide.

The operation of the device may be conveniently described with reference to a rubber heel from which it is desired to remove the overflow. The cutter 9 is rotated counter-clockwise in Figure 3 by means of the pulley 7 which may be connected to a suitable source of power. The heel to be trimmed is laid on the platform 12 with the overflow up and is then moved toward the cutter in such manner that the outer periphery of the heel contacts with the outer periphery of the lug 18.

The set screw 24 should be adjusted to hold the guide 19 spaced from the platform 12 a distance slightly less than the thickness of the heel. As the heel is moved toward the cutting edge, the upper side thereof will be forced under the guide 19 and the pressure of the spring 21 will hold the heel toward the platform. If the thickness of the heel varies, the guide 19 may rise or fall to accommodate itself to such variation. If desired, the operator may by suitable adjustment of the handle 23 move the guide 19 to accommodate heels of varying thickness.

It is to be understood that the invention is not limited to the embodiment shown herein for purposes of illustration, but that on the contrary it may be variously modified and embodied within the scope of the subjoined claims.

I claim as my invention:

1. A trimming device, comprising, a rotary cutter having an annular cutting edge, a pair of guide members cooperating therewith, one of said guide members being fixed, and the other said guide being mounted to rotate on an axis coincident with that of said rotary cutter.

2. A trimming device, comprising, a rotary cutter having an annular cutting edge, a pair of guide members cooperating therewith, one of said guide members being fixed, the other said guide being mounted to rotate on an axis coincident with that of said rotary cutter, and means to adjust said guide members to accommodate objects of varying thickness.

3. A trimming device, comprising, a rotary cutter having an annular cutting edge, a pair of guide members cooperating therewith, one of said guide members being fixed, the other said guide being mounted to rotate on an axis coincident with that of said rotary cutter, and yielding means to urge said rotating guide toward said fixed guide.

4. A trimming device, comprising, a rotary cutter having an annular cutting edge, a pair of guide members cooperating therewith, one of said guide members being fixed, the other said guide being mounted to rotate on an axis coincident with that of said rotary cutter, yielding means to urge said rotating guide toward said fixed guide, and means to adjust and limit the movement of said rotating guide.

In testimony whereof, I have signed my name to this specification this 25th day of August, 1923.

PENROSE R. HOOPES.